United States Patent Office 3,372,732
Patented Mar. 12, 1968

3,372,732
METHOD FOR BONDING ALUMINUM TO BORIDES
Alan C. Cocks, Surbiton, Surrey, and Anthony A. R. Wood, North Holmwood Dorking, Surrey, England, assignors to United States Borax & Chemical Corporation, Los Angeles, Calif.
No Drawing. Filed Sept. 30, 1963, Ser. No. 312,275
Claims priority, application Great Britain, Oct. 15, 1962, 39,010/62
3 Claims. (Cl. 164—102)

ABSTRACT OF THE DISCLOSURE

A method is provided for bonding aluminum to abrasion-resistant borides, such as titanium diboride. The method comprises heating molten aluminum in contact with the boride to a temperature of at least 1100° C. and then cooling the aluminum to below its melting point. Preferably a flux which dissolves any oxide layer present on the aluminum or boride is employed.

---

This invention relates to the bonding of aluminum to abrasion-resistant borides, especially titanium diboride.

The bonding of borides to aluminum has assumed considerable importance with the use of such borides as titanium diboride as leads and electrodes in the electrolytic production of aluminum. Hitherto, aluminum has been bonded to such abrasion-resistant borides as titanium diboride by first electrodepositing on the boride a layer of a metal which can be soldered or otherwise bonded to aluminum, for example cobalt and nickel, and then joining the aluminum to the electrodeposit.

The present invention provides a process whereby aluminum can be directly bonded to titanium diboride or other abrasion-resistant borides and so avoids the inconvenient procedure described above.

According to the present invention, aluminum is bonded to such borides by effecting contact between the aluminum and the boride at a temperature of at least 1100° C., and then cooling the aluminum to below its melting point.

To achieve good bonding it is important to ensure that the bonding surfaces are as clean as possible. To this end it is desirable to work in an inert atmosphere, for example of argon, carbon monoxide or hydrogen. The use of a suitable flux also facilitates the maintenance of clean bonding surfaces. Suitable fluxes are those which dissolve oxide layers formed by exposure of the boride or the aluminum to an oxidizing atmosphere, and include elemental boron, cryolite, potassium borofluoride and potassium fluorotitanate. The use of a flux also tends to lower the temperature required for formation of a bond of maximum strength. Thus, when aluminum is to be bonded to titanium diboride in the absence of a flux, it is preferable to employ a temperature of at least 1300° C. When, however, boron or cryolite is used as a flux, a very strong bond can be obtained at 1200° C. and 1100° C., respectively.

The period for which the boride and the aluminum must be maintained in contact at the elevated temperature can be varied. The materials should, however, naturally be maintained in contact until the boride surface is completely wetted by the molten aluminum and preferably also long enough for any flux employed to dissolve completely any oxide layer present on the aluminum or boride.

In a preferred embodiment of this invention bonding is carried out by first fitting a tubular sheath of heat resisting material around the top of a vertically disposed rod of titanium diboride or other boride and then filling the cavity formed by the top of the sheath and the top of the rod with aluminum. The assembly is introduced into an electric furnace and heated in an inert atmosphere to the appropriate temperature. On cooling and removal of the sheath, the titanium boride rod is found to be firmly bonded to the aluminum, which in turn may be attached to an electric conductor.

The invention, in addition to being useful for bonding aluminum to borides in the form of rods, may also be useful for bonding together particles of the borides.

The invention is illustrated by the following examples.

Example I

Using the following procedure, titanium diboride rods were heated in contact with aluminum at various temperatures. A tubular sheath of heat-resisting material was placed around the top of a vertically disposed rod of titanium diboride and the cavity formed by the top of the sheath and the top of the rod was filled with aluminum. The resulting assembly was introduced into an electric furnace and heated in an inert atmosphere to the appropriate temperature. On cooling and removal of the sheath, the rod was examined for bonding to the aluminum. At 900° C. and 1000° C. no bonding took place. At 1100° C. some bonding occurred though a stronger bond was obtained at 1200° C. At 1300° C. an excellent bond was obtained.

Example II

Example I was repeated using boron as a flux. At 900° C. and 1000° C. no bond was obtained. At 1100° C. a satisfactory bond was obtained, at 1150° C. a better one, and at 1200° C. an excellent bond.

Example III

Example I was repeated using cryolite as a flux. At 900° C. no bond was obtained and at 1000° C. an unsatisfactory bond. At 1100° C., however, an excellent bond was obtained.

Other modes of applying the principle of the invention may be employed, change being made as regards the details described, provided the features stated in any of the following claims or the equivalent of such be employed.

We, therefore, particularly point out and distinctly claim as our invention:

1. The method of bonding aluminum to titanium diboride which comprises heating said titanium diboride in contact with molten aluminum at a temperature of 1100° C. to about 1300° C. and in the presence of a cryolite flux and then cooling said aluminum to below its melting point.

2. The method according to claim 1 in which the molten aluminum and titanium diboride are heated in an inert atmosphere.

3. The method according to claim 1 in which said titanium diboride is in the form of an electrode bar for aluminum production.

References Cited

UNITED STATES PATENTS

| 2,544,670 | 3/1951 | Grange et al. | 164—102 |
| 3,028,644 | 4/1962 | Waldrop | 164—102 |
| 2,015,482 | 9/1935 | Lilienfeld | 164—108 X |
| 2,015,483 | 9/1935 | Lilienfeld | 164—109 X |
| 2,015,484 | 9/1935 | Lilienfeld | 164—108 X |
| 3,037,857 | 6/1962 | Conant | 75—202 X |
| 3,186,044 | 1/1965 | Ransley | 164—48 |
| 3,213,188 | 10/1965 | Armand | 29—473.1 X |
| 3,180,023 | 4/1965 | Titus | 29—473.1 X |
| 3,100,338 | 8/1963 | Henry | 29—473.1 |

J. SPENCER OVERHOLSER, Primary Examiner.

V. K. RISING, Assistant Examiner.